United States Patent [19]

Humphries et al.

[11] Patent Number: 4,683,056
[45] Date of Patent: Jul. 28, 1987

[54] COLD TRAP APPARATUS

[75] Inventors: John Humphries; Neil S. Morrison, both of Thurso, Scotland

[73] Assignee: United Kingdom Atomic Energy Authority, London, England

[21] Appl. No.: 648,934

[22] Filed: Sep. 10, 1984

[30] Foreign Application Priority Data

Sep. 28, 1983 [GB] United Kingdom ............ 8325936

[51] Int. Cl.$^4$ .............................................. B01D 8/00
[52] U.S. Cl. ................................. 210/186; 210/187; 62/123
[58] Field of Search ............... 210/774, 775, 176, 187, 210/175; 55/208; 62/13-18, 123, 124

[56] References Cited

U.S. PATENT DOCUMENTS

| | | | |
|---|---|---|---|
| 3,337,051 | 8/1967 | Kerschner et al. | 210/176 |
| 3,370,714 | 2/1968 | Trawinski | 210/521 |
| 3,483,980 | 12/1969 | Cochran et al. | 210/186 |
| 3,552,485 | 1/1971 | Ledannou | 210/186 |
| 3,693,959 | 9/1972 | Swinhoe et al. | 210/774 |
| 4,272,373 | 6/1981 | Stenberg et al. | 210/175 |

Primary Examiner—John Adee
Attorney, Agent, or Firm—William R. Hinds

[57] ABSTRACT

Cold trap apparatus for the purification of liquid metal such as sodium comprises a cooled vessel (20) within which a number of concentric cylinders (23) are located such that the liquid metal flow takes place downwardly in the gap between the vessel (20) and the outermost cylinder (23) and upwardly along the gaps between the cylinders (23). The cylinders (23) present extended surfaces across which the liquid metal flows with deposition of solute (24) along such surfaces. The surfaces of the cylinders (23) may be of a roughened nature with respect to the liquid metal flow, e.g. they may be covered with a single layer mesh (21).

9 Claims, 3 Drawing Figures

COLD TRAP APPARATUS

BACKGROUND OF THE INVENTION

This invention relates to cold trap apparatus for the purification of liquid metals such as sodium.

It is known, in the field of sodium-cooled nuclear reactors, to lower the temperature of a fraction of a circulating coolant in a vessel externally cooled and having a meshwork filling so that impurities in the sodium (such as oxides and hydrides) are initially retained in the cooled sodium in a supersaturated solution form and, on passing through the meshwork filling, are precipitated by crystallisation on to the meshwork. Such devices are known as "cold traps" and flows take place therethrough at a low velocity over large surface areas. Traditionally the meshwork is in the form of mesh-filled basket units which offer said large surface area.

In the use of known traps a number of features have now been noted. For example, the deposition of impurities tends to be predominantly at the inlet faces of the units, the deposition takes place in a non-uniform manner, and deposition can occur on the walls of the cooled vessel. Additionally sudden onset of blocking can occur with loss of purification. These features are not conducive to cost advantageous design and operation and the present invention seeks an improvement in relation to them.

FEATURES AND ASPECTS OF THE INVENTION

The present invention seeks to improve technology by providing novel cold traps having an increased trapping rate, increased acceptable impurity loading before blockage occurs, and reduced risk of the sudden onset of blocking. This is achieved by presenting the cooled liquid metal with extended surfaces (which may be roughened or lined with a layer of mesh material) with flow across the surfaces.

The present invention is based on the recognition that efficient deposition of solute can be obtained by flow of the sodium across extended surfaces and consequently it is unnecessary to cause the sodium to flow through substantial bodies fabricated from mesh. Mesh filled traps have been found to give an unexpectedly poor performance and it is believed that this is because solute deposition occurs primarily at the entry face of the mesh owing to the initial formation of a thin film at the entry face with the result that deposition then occurs on the face of this film and only a small degree of deposition occurs within the body of the mesh.

DESCRIPTION OF THE DRAWINGS

The invention will now be described further with reference to the accompanying drawings, by way of example, in which drawings.

THE PRIOR ART

Figure 1:
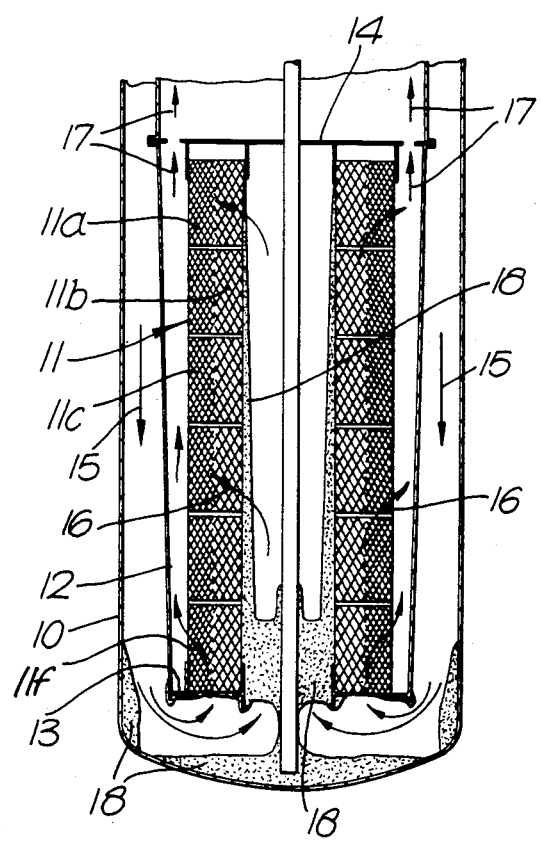
FIG. 1 illustrates in sectional elevation a currently used form of cold trap.

In FIG. 1 (prior art) there is shown a cold trap comprising a cooled vessel 10 having a meshwork filling 11, a vertical baffle 12, a perforated base 13 to support the meshwork filling 11 and a horizontal exit baffle 14. Inlet sodium flow is represented by arrows 15, meshwork flow is represented by arrows 16 and the outlet flow is represented by arrows 17. The filling 11 consists of six stackable basket units 11a, b, c etc.

Deposits of impurities, formed by crystallisation from cooled sodium containing a supersaturated solution of the impurities, are shown on the vessel wall, the vessel base and the entry faces of the basket units.

FIG. 1 illustrates a potential blockage situation (in practice small channels do remain and which will accept some of the low velocity flow which occurs in cold traps) and a non-uniformity represents a low impurity loading and a diminishing trapping rate which could arise suddenly.

DESCRIPTION OF THE PREFERRED EMBODIMENTS

Figure 2:
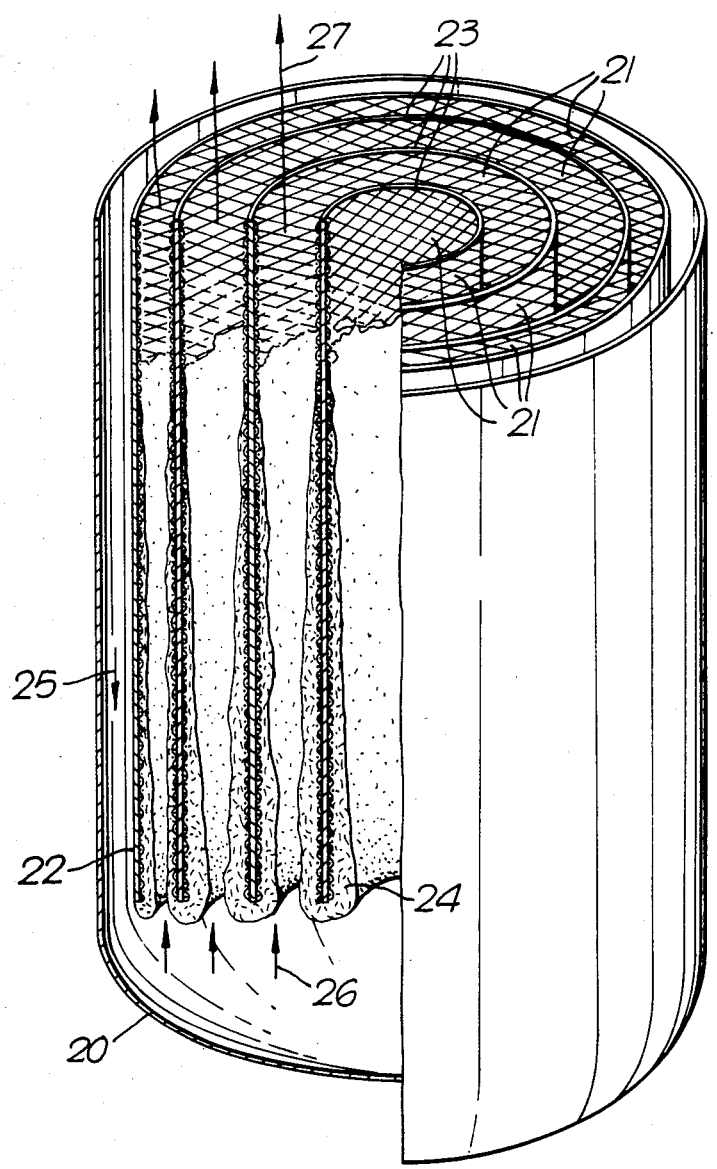
FIG. 2 is a cut-away diagrammatic perspective view of one form of a cold trap in accordance with the invention.

In FIG. 2 a cold trap is presented having a cooled vessel 20, a vertical baffle 22 and extended and roughened surfaces provided by concentric cylinders 23 with a single layer mesh covering 21 on both inner and outer surfaces of the cylinders. Inlet flow is represented by arrows 25, deposition flow by arrows 26 and outlet flow by arrows 27.

Deposition takes place on the coverings 21 rather like deposition took place on the inner surface of units 11 in FIG. 1 but the large voidage required by the units 11 is avoided and a greater surface area is provided for deposition for a given volume of vessel 21 and hence a greater impurity loading is obtained, the deposition takes place in a more uniform manner, a higher deposition rate is achieved and the risk of sudden blockage is less likely.

The coverings 21 can be made in various forms, and, in fact, the technology of providing extended heat transfer surfaces can be considered to provide suitable extended impurity depositing surfaces. One form of covering 21 can be derived for example from the use of expanded metal but investigation to date shows preference for a mesh covering.

Figure 3:
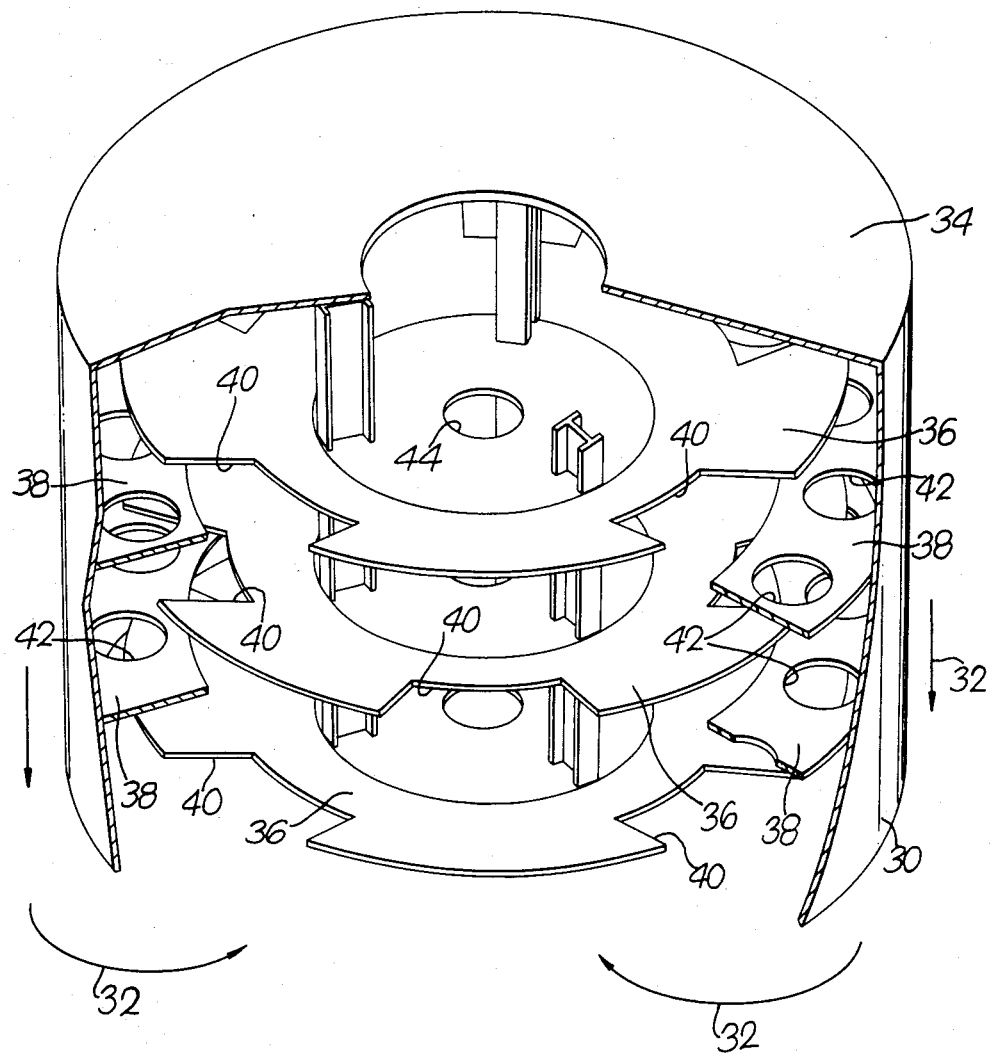
FIG. 3 is a perspective view, partly cut-away, of the preferred form of trap unit in accordance with the invention.

FIG. 3 illustrates the presently preferred form of trap unit which will be housed within a cooled vessel similar to the vessel depicted by reference numerals 10 and 20 in FIGS. 1 and 2. The unit comprises an outer tubular enclosure 30 which may be cylindrical as shown and is open at its bottom end so that the flow of liquid sodium (as indicated by arrows 32) passes downwardly along the annular gap between the enclosure 30 and the cooling vessel and is then deflected upwardly at the bottom of the vessel into the open end of the enclosure 30. The upper end of the enclosure 30 is provided with an exit baffle 34 through which the sodium discharges upwardly.

The enclosure 30 contains a number of axially spaced deflector plates 36 which deflect the flow of sodium laterally towards the wall of the enclosure 30. A series of axially spaced spoiler plates 38 are located adjacent the enclosure wall in axially offset relation to the deflector plates 36 so as to at least partially deflect the flow of sodium away from the enclosure wall.

The main aim in this embodiment is to ensure that the flow contiguous to the deposition areas is always of supersaturated sodium. This facilitates the build up of an even deposit of solute on the vertical wall of the enclosure 30 and consequently means is provided to distribute the axial flow gradually towards the vertical wall. Such means may comprise cut-outs 40 in the defelctor plates 36, which cut-outs allow some degree of axial flow to take place past each deflector plate so that, for example, the entire axial flow entering the enclosure 30 is not deflected onto the vertical wall by the lowermost deflector. The cut-outs 40 in successive deflectors may be angularly offset as shown so that channelling of the axial flow is prevented. Typically, the cut-outs 40 may be arranged so that approximately one third of the axial flow is deflected to the vertical wall by each plate 36.

The deflectors 36 provide some degree of mixing which is enhanced by the spoilers 38. The radial extent of each spoiler 38 is such that it will protrude through the deposite of solute at all times. However, during the early part of the life of the trap, it is desirable that the spoilers should not deflect flow completely away from the vertical wall and to this end the spoilers are provided with means for affording some degree of flow along the wall. Such means may comprise apertures 42 which may be angularly offset from one spoiler to the next.

It will be noted that the deflectors 36 also include central holes 44. These are for reception of a central pipe for instrumentation and do not have any function in terms of controlling sodium flow through the trap.

The way in which the solute is deposited will vary through the life of the trap unit. Initially there will tend to be a greater flow up the vertical wall of the enclosure 30 at the points where the deflectors deflect flow towards it; hence deposition in these areas will grow more rapidly. When the deposits cover the edges of the deflector plates the flow pattern will change and all flow will take place through the cut-outs or gaps 40. Deposition will then concentrate at the surfaces above the gaps 40.

The embodiment of FIG. 3 may be extended axially if desired so as to present a larger surface area for solute deposition and the numbers of deflectors and spoilers may, in this event, be increased.

We claim:

1. Cold trap apparatus for the purification of liquid metals, comprising a vessel through which liquid metal passes from an inlet to an outlet and which is subject to external cooling, in which the vessel includes means additional to the vessel for presenting extended surfaces across which the liquid metal is caused to flow in passing from the inlet to the outlet and in which impurities are precipitated, said additional means permitting flow from the inlet to the outlet without passing through filter means, in which said extended surfaces are presented by plural tubular enclosures open-ended at least at their bottom ends along the surfaces of which the liquid metal flows, and in which said enclosures are nested within one another so as to provide annular gaps through which the liquid metal flows.

2. Apparatus as claimed in claim 1 in which a layer of mesh material covers the surfaces of each tubular enclosure.

3. Cold trap apparatus for the purification of liquid metals, comprising a vessel through which liquid metal passes from an inlet to an outlet and which is subject to external cooling, in which the vessel includes means additional to the vessel for presenting extended surfaces across which the liquid metal is caused to flow in passing from the inlet to the outlet, said additional means permitting flow from the inlet to the outlet without passing through filter means, in which said extended surfaces are presented by at least one tubular enclosure open-ended at least at its bottom end along the surface of which the liquid metal flows, and in which a layer of mesh material jcovers the surfaces of each tubular enclosure.

4. Cold trap apparatus for the purification of liquid metals, comprising a vessel through which liquid metal passes from an inlet to an oulet and which is subject to external cooling, in which the vessel includes means additional to the vessel for presenting extended surfaces across which the liquid metal is caused to flow in passing from the inlet to the outlet, said additional means permitting flow from the inlet to the outlet without passing through filter means, in which said extended surfaces are presented by at least one tubular enclosure open-ended at least at its bottom end along the surface of which the liquid metal flows, and in which said at least one tubular enclosure accommodates within its interior deflector plates which direct flow of liquid metal towards the wall of the enclosure.

5. Apparatus as claimed in claim 4 in which said deflector plates obstruct the liquid flow to different extents in a circumferential direction.

6. Apparatus as claimed in claim 5 in which said deflector plates are each formed with at least one cut-out formation which offers insignificant obstruction to liquid metal flow whereby a proportion of the flow remains undeflected by individual deflectors.

7. Apparatus as claimed in claim 6 in which the cut-out formation(s) in one deflector plate are angularly offset with respect to those in the adjacent deflector plate or plates.

8. Cold trap apparatus for the purification of liquid metals, comprising:
    a vessel;
    means for feeding liquid metal into the vessel; external cooling means associated with the vessel so as to cool the contents thereof;
    a tubular enclosure within the vessel, said enclosure having an open end presented towards the base of the vessel whereby liquid metal flows upwardly through said open end;
    an exit port in the upper end of the enclosure; a plurality of axially spaced deflector plates mounted within the enclosure for deflecting the upward liquid metal flow laterally;
    at least one spoiler plate within the enclosure for at the spoiler plate(s) being axially offset in relation to the deflector plates;
    each deflector plate being formed with at least one cut-out formation whereby a limited proportion of the upwardly-directed liquid metal flow is unimpeded by each deflector plate; and
    said cut-out formations of adjacent deflector plates being angularly offset whereby the unimpeded proportion of flow passing a lower deflector plate impinges upon and is laterally deflected by the deflector plate above it.

9. Cold trap apparatus as claimed in claim 8 in which each spoiler plate has openings therein which permit a limited degree of substantially continuous flow along said side wall.

* * * * *